United States Patent
Liao et al.

(10) Patent No.: US 6,481,475 B1
(45) Date of Patent: Nov. 19, 2002

(54) WOOD PLANING MACHINE WITH A WOOD SHAVING COLLECTING MECHANISM

(76) Inventors: Juei-Seng Liao, No. 295, Sec. 1, Nanking E. Rd., Taichung City (TW); Pei-Lieh Chiang, No. 12, Nan-Ping Rd. Nan Dist., Taichung City (TW)

( * ) Notice: Subject to any disclaimer, the term of this patent is extended or adjusted under 35 U.S.C. 154(b) by 0 days.

(21) Appl. No.: 10/102,369

(22) Filed: Mar. 20, 2002

(30) Foreign Application Priority Data

Dec. 31, 2001 (TW) .................. 90224280 U (51) Int. Cl.[7] .................. B27G 21/00; B27G 19/00
(52) U.S. Cl. .................. 144/252.1; 15/312.2; 15/314; 144/114.1; 144/117.1; 451/453; 451/456
(58) Field of Search .................. 451/435, 453, 451/456; 409/137; 144/114.1, 117.1, 129, 130, 252.1; 15/312.2, 314, 415.1; 83/100

(56) References Cited

U.S. PATENT DOCUMENTS

| | | | |
|---|---|---|---|
| 3,167,260 A | 1/1965 | Gibbons et al. | 241/56 |
| 4,088,164 A | 5/1978 | McCord, Jr. | 144/252.1 |
| 4,485,859 A | 12/1984 | Krogstad et al. | 144/252.1 |
| 5,525,396 A | 6/1996 | Rudolph et al. | 428/131 |
| 5,595,227 A | 1/1997 | Varley | 144/253.6 |
| 6,293,321 B1 | 9/2001 | Chiang | 144/252.1 |
| 6,382,278 B1 * | 5/2002 | Liao et al. | 144/252.1 |

* cited by examiner

Primary Examiner—W. Donald Bray
(74) Attorney, Agent, or Firm—Ladas & Parry (57) ABSTRACT

A wood planing machine includes a support carriage movably mounted on two sides of a mounting frame for supporting a cutting shaft. A motor housing and a shaving collecting member are disposed on the carriage. The collecting member confines a shaving passageway along the cutting shaft, and has an outlet port adjacent to one side. An air conduit is disposed for passage of introduced air into the shaving passageway from the other side to enhance entraining of wood shavings. An air stream deflecting member is disposed to deflect air stream to pass by the outlet port for onward movement to a blower.

6 Claims, 12 Drawing Sheets

WOOD PLANING MACHINE WITH A WOOD SHAVING COLLECTING MECHANISM

CROSS-REFERENCE TO RELATED APPLICATION

This application claims priority of Taiwan patent Application No. 090224280, filed on Dec. 31, 2001.

BACKGROUND OF THE INVENTION

1. Field of the Invention

This invention relates to a wood planing machine, more particularly to a wood planing machine with a wood shaving collecting mechanism which is driven by a motor of the machine.

2. Description of the Related Art

Figure 1:
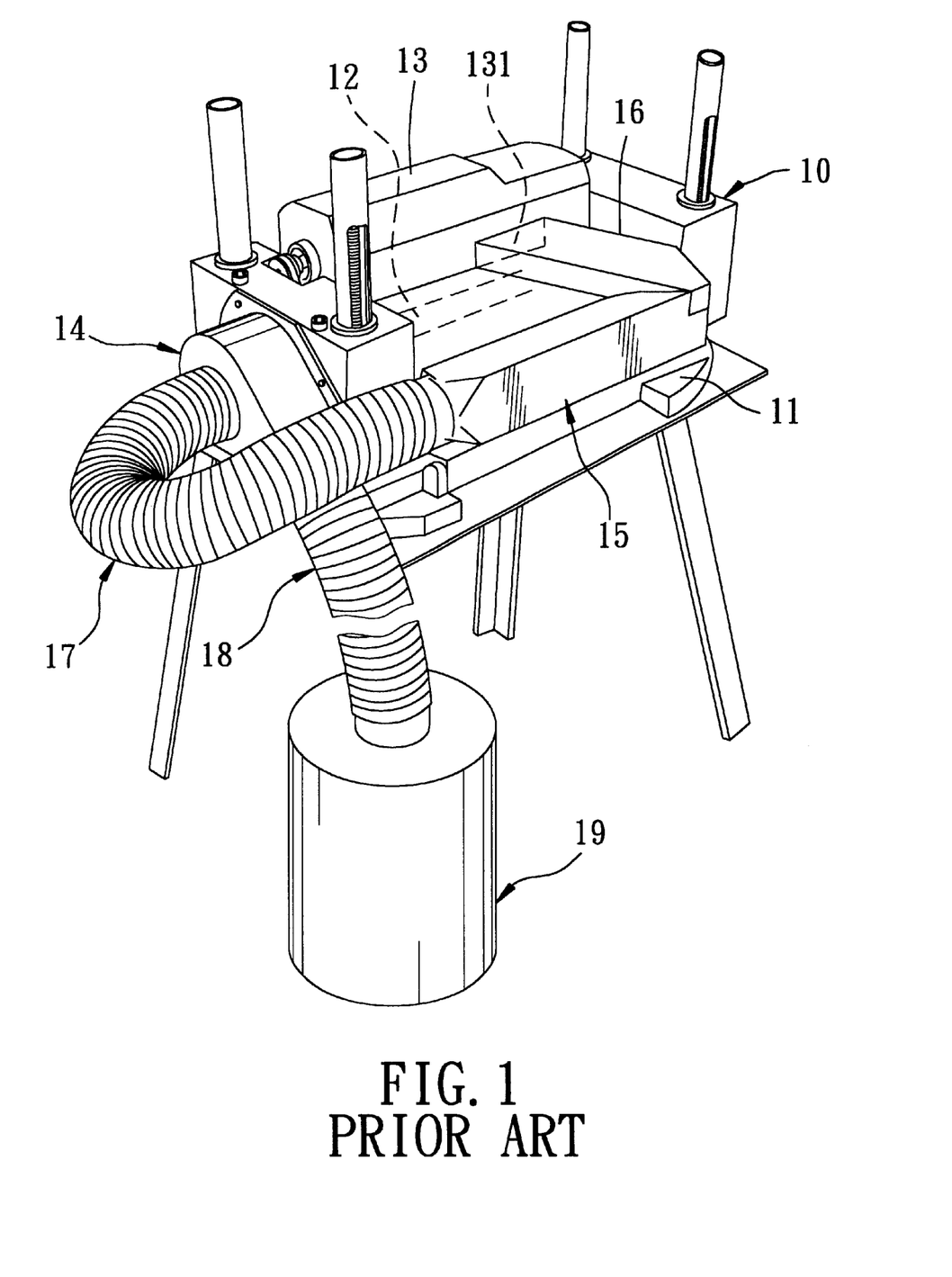
FIG. 1 is a perspective view of a conventional wood planing A machine.

Referring to FIG. 1, a wood planing machine disclosed in U.S. Pat. No. 6,293,321 is shown to include a base 11, a support carriage 10 for rotatably mounting a cutting shaft 12 thereon, a motor housing 13 mounted on the carriage 10 and having a vent port 131, a motor (not shown) disposed in the motor housing 13 to drive rotation of the cutting shaft 12, a drive shaft (not shown) extending from the cutting shaft 12, a blower 14 mounted on the carriage 10 and having an impeller (not shown) driven by the drive shaft, a shaving collecting member 15 mounted on the carriage 10 to define a passageway, and an air duct 16 in fluid communication with the vent port 131 and the shaving collecting member 15 so as to enhance removal of wood shavings upon planing. A flexible conduit 17 interconnects the blower 14 and an outlet port of the shaving collecting member 15. Another flexible conduit 18 is connected to a discharge port of the blower 14 and a shaving collector 19.

Although wood shavings can be collected upon planing, they tend to collect at a corner of the shaving collecting member 15 away from the blower 14. Moreover, owing to the provision of the flexible conduit 18 for interconnecting the blower 14 and the shaving collecting member 15, the machine is bulky.

SUMMARY OF THE INVENTION

The object of the present invention is to provide a wood planing machine which can overcome the aforesaid problems of the prior art.

According to this invention, the wood planing machine includes a mounting frame which has right and left sides spaced apart from each other in a longitudinal direction, upper and lower ends opposite to each other in an upright direction, and front and rear sides spaced apart from each other in a transverse direction. A support carriage is mounted on the right and left sides and is disposed movably between the upper and lower ends in the upright direction. A motor housing is mounted on the support carriage to receive a motor. The motor has an output shaft extending in the longitudinal direction to deliver a driving force. An air duct is disposed adjacent to the right side for passage of introduced air, and has communicating port disposed proximate to the front side and facing rearwardly for delivery of the introduced air. A cutting member has a rotatable cutting shaft which is mounted on the support carriage and proximate to the rear side, and which is driven by the output shaft. A blower casing is disposed adjacent to the left side, and has proximate and distal walls spaced apart from each other in the longitudinal direction and respectively proximate and distal to the left side to confine an accommodation chamber, and a discharge port disposed between the proximate and distal walls and extending in a direction radial to the longitudinal direction. The distal wall has an inlet port formed therethrough. A shaving collecting member is disposed on the support carriage and rearwardly of the motor housing to confine a shaving passageway for collecting wood shavings. The shaving passageway has an intake port disposed in the vicinity of the cutting shaft, and an outlet port connected to the inlet port so as to communicate the shaving passageway with the accommodation chamber. An air conduit confines a flow channel which is connected to and which is in fluid communication with the communicating port and the intake port and which extends in the transverse direction to permit air stream to flow rearwardly. An air stream deflecting member is disposed on the support carriage proximate to the rear side and adjacent to the right side, and has a deflecting wall which is disposed downstream of the communicating port and upstream of the outlet port to deflect the air stream into a route that confronts the inlet port in the longitudinal direction, such that the deflected air stream flowing along the route passes by the outlet port so as to entrain wood shavings thereinto for onward movement to the inlet port. A drive shaft is rotatably mounted on the proximate wall, and has a first end which extends into the accommodation chamber to engage an impeller, and a second end which extends from the first end and outwardly of the distal wall. A drive transmission member is disposed to transmit the driving force of the output shaft to the second end of the drive shaft so as to rotate the drive shaft when the motor is operated. Thus, wood shavings can be drawn from the shaving collecting member into the accommodation chamber and out of the discharge port.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 2:
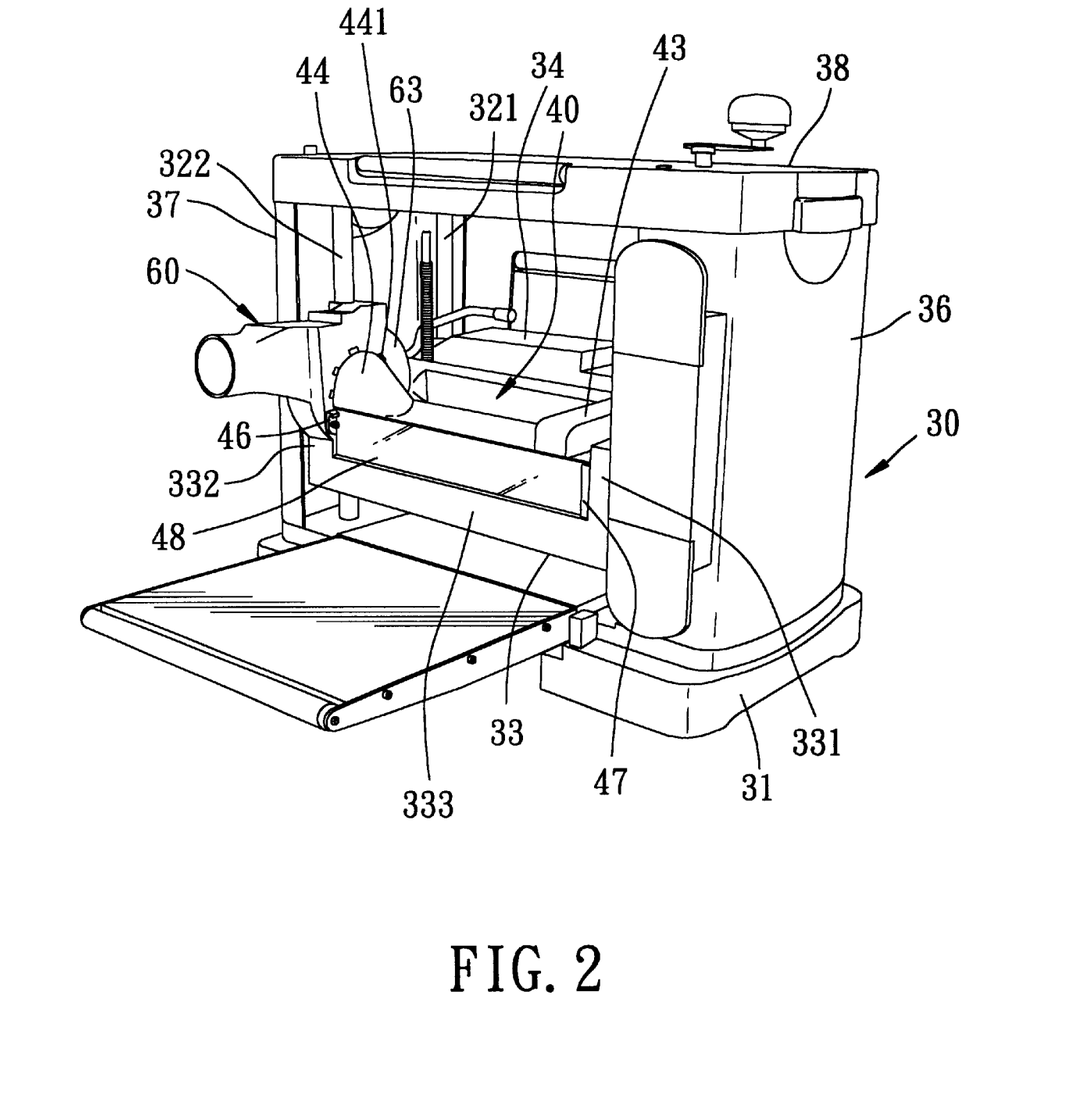
FIG. 2 is a perspective view of a first preferred embodiment of a wood planning machine according to this invention.

Referring to FIG. 2, the first preferred embodiment of the wood planing machine according to the present invention is shown to comprise a mounting frame 30 which includes a base seat 31, and right and left sides 36,37 spaced apart from each other in a longitudinal direction. Each of the right and left sides 36,37 has front and rear support rods 321,322 which extend in an upright direction from the base seat 31 and which are spaced apart from each other in a transverse direction relative to the longitudinal direction. An upper plate 38 is mounted on upper ends of the right and left sides 36,37.

Figure 3:
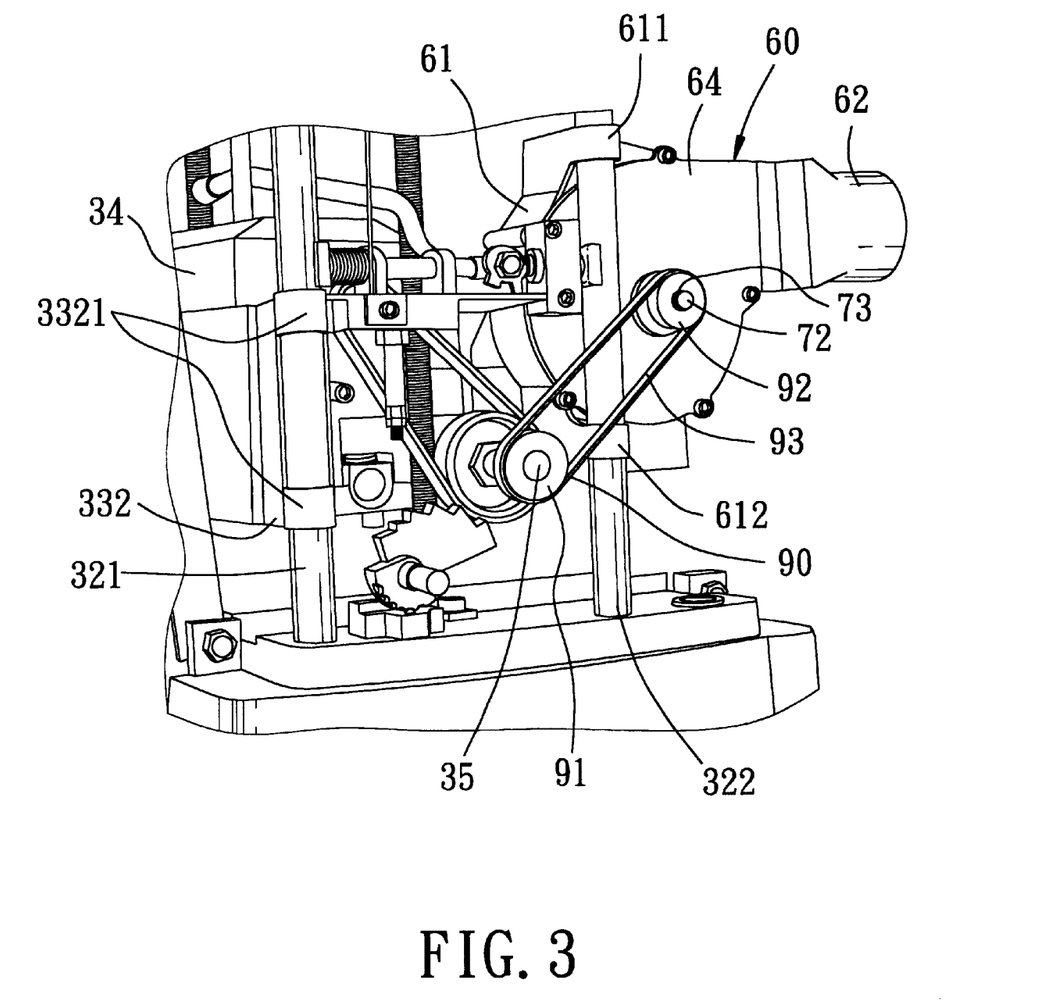
FIG. 3 is a left side perspective view of a portion of the first preferred embodiment.
Figure 4:
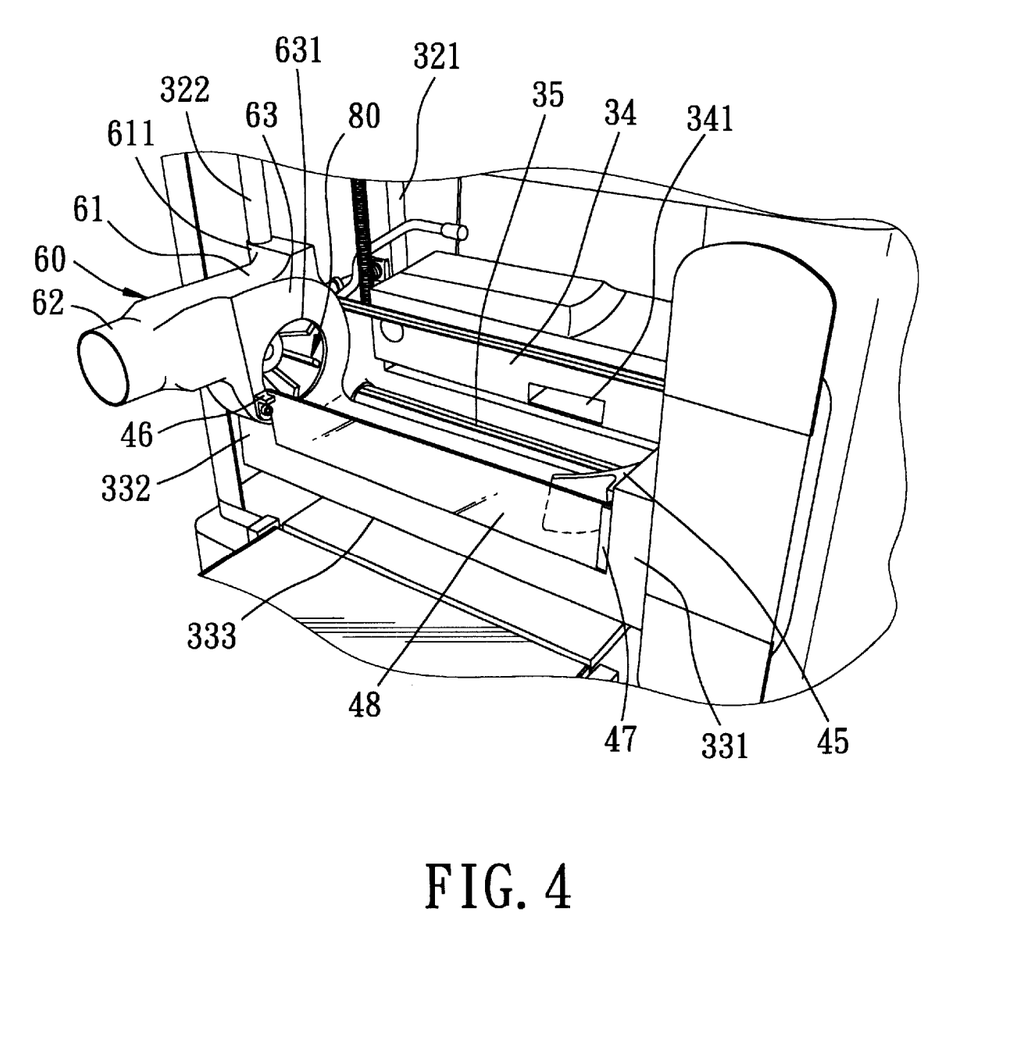
FIG. 4 is a perspective view of another portion of the first preferred embodiment, a shaving collecting plate and an air conduit being removed for the sake of clarity.

With further reference to FIGS. 3 and 4, a support carriage 33 includes two side portions 331,332 with sleeves 3321 which are sleeved on the support rods 321,322 of the right and left sides 36,37 between the upper plate 38 and the base seat 31 such that the support carriage 33 is movable in the upright direction. A support seat 333 is disposed between the side portions 331,332.

A motor housing 34 is mounted on a front portion of the support seat 333, and has a vent port 341 which is formed adjacent to the right side 36 and which faces rearwardly. A motor (not shown) is disposed in the motor housing 34 and has an output shaft (not shown) which defines a first axis that extends in the longitudinal direction to deliver a driving force. An air duct (not shown) is formed in the motor housing 34 for passage of introduced air, and has the vent port 341 as a communicating port for delivery of the introduced air.

A cutting member has a rotatable cutting shaft 35 which is mounted on the support carriage 33 downwardly and forwardly of the motor housing 34, and which is driven by the output shaft of the motor in a known manner to be rotatable about a second axis parallel to the first axis.

Figure 6:
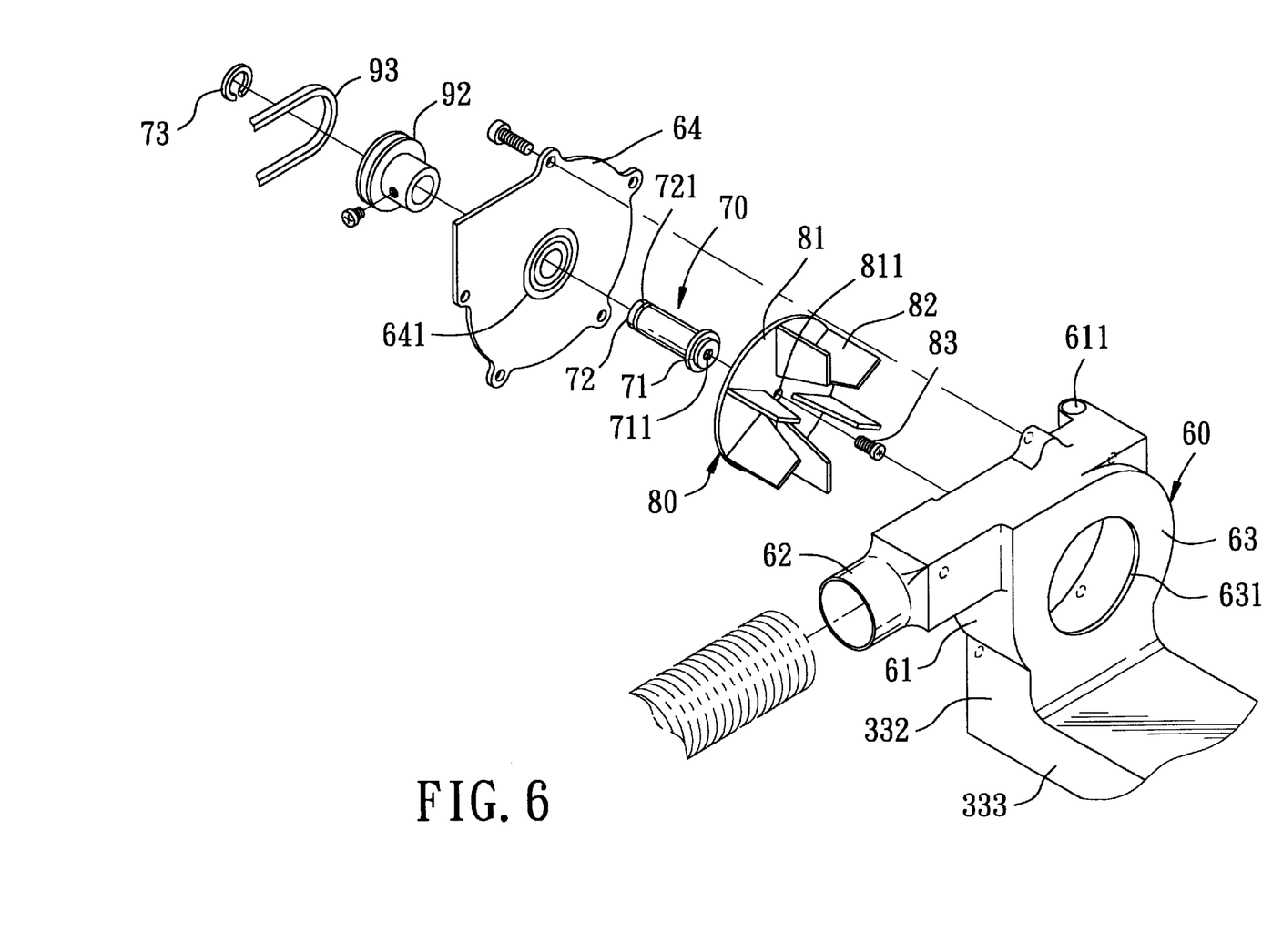
FIG. 6 is an exploded perspective view showing a blowing mechanism of the first preferred embodiment.
Figure 8:
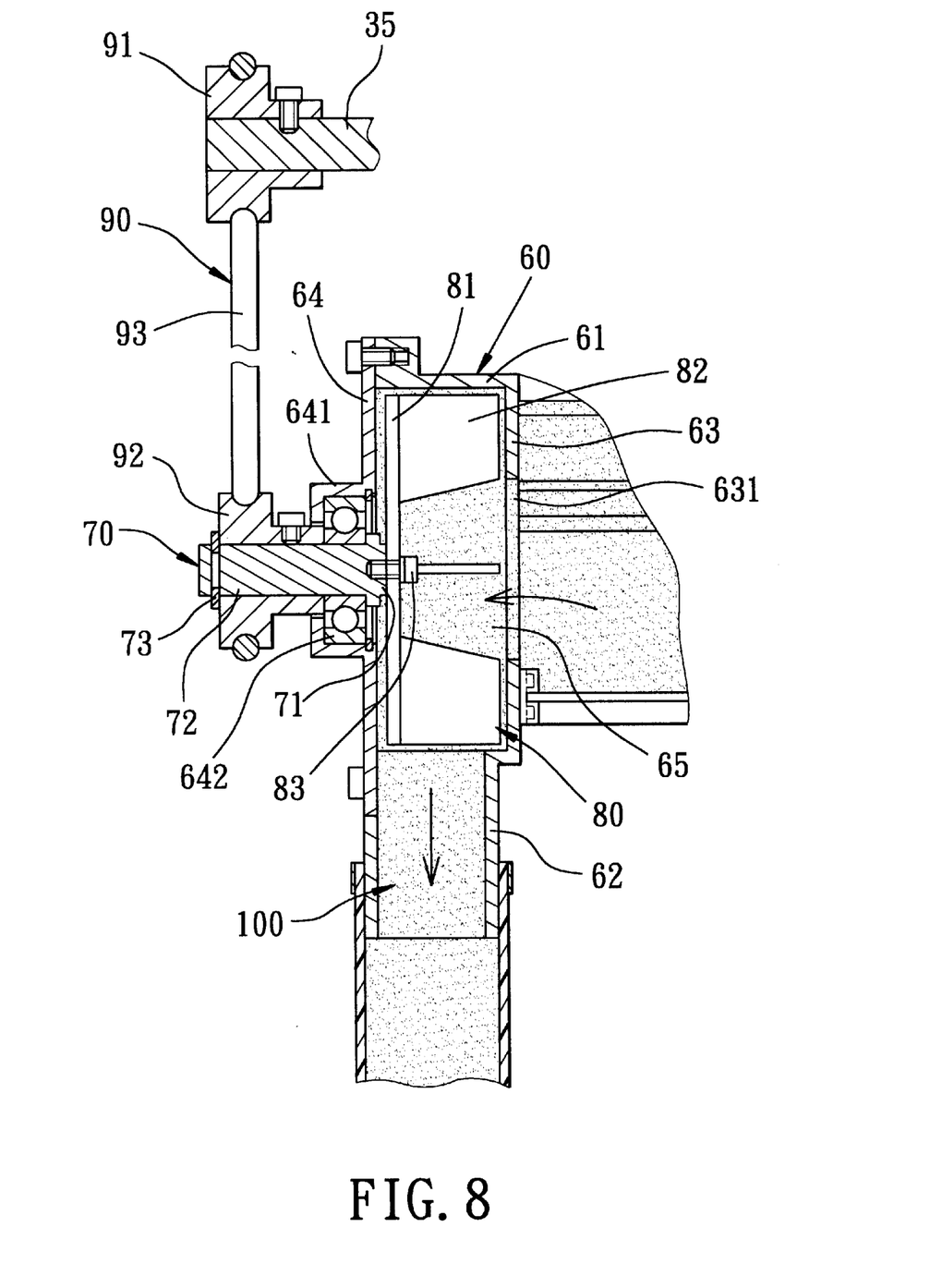
FIG. 8 is a fragmentary sectional view showing how the blowing mechanism is operated to draw wood shavings.

With reference to FIGS. 2, 6 and 8, a blowing mechanism 60 is disposed on the left side portion 332 of the support carriage 33, and includes a blower casing 61, a drive shaft 70, and an impeller 80. The blower casing 61 has proximate and distal walls 64,63 which are spaced apart from each other in the longitudinal direction and which are respectively proximate and distal to the left side 37 to confine an accommodation chamber 65, and a discharge port 62 which is disposed between the proximate and distal walls 64,63 and which extends in a direction radial to the longitudinal direction. The distal wall 63 has an inlet port 631 formed therethrough. The proximate wall 64 has a bearing seat 641 for receiving a bearing 642 therein. As shown in FIG. 3, two sleeves 611,612 are disposed to be sleeved on one rear support rod 322 to hold the blower casing 61 slidably relative thereto.

The drive shaft 70 is rotatably mounted on the proximate wall 64, and extends along a third axis parallel to the first axis. The drive shaft 70 has a first end 71 which extends into the accommodation chamber 65 through the bearing 642, and a second end 72 which extends from the first end 71 and outwardly of the bearing seat 641. A drive transmission member 90 includes a drive pulley 91 which is mounted to rotate with the cutting shaft 35, a driven pulley 92 which is sleeved on and which is rotated with the second end 72 of the drive shaft 70 and which is retained on the drive shaft 70 by a snap ring 73 that engages an annular groove 721 in the second end 72, and a belt 93 which is trained on the drive and driven pulleys 91,92 to transmit rotating force of the output shaft via the cutting shaft 35 to rotate the drive shaft 70 when the motor is operated.

The impeller 80 is received in the accommodation chamber 65, and includes a connecting plate 81 which is secured on the first end 71 by a screw 83 that passes through a hole 811 and that engages threadedly a screw hole 711 in the first end 71 so as to be driven by the first end 71 to rotate a plurality of fins 82 on the connecting plate 81 about the third axis.

Figure 5:
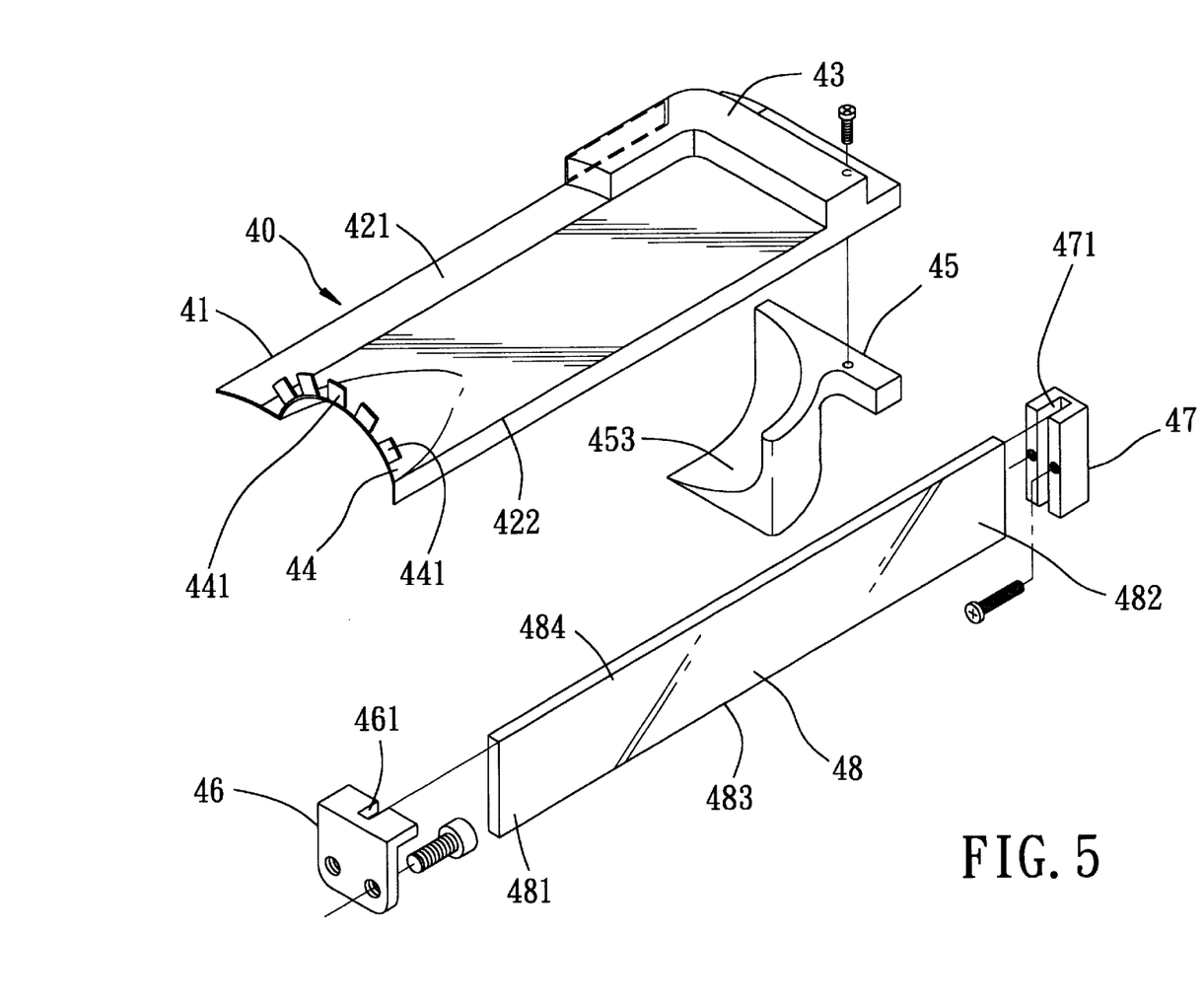
FIG. 5 is an exploded perspective view showing a shaving collecting member and an air stream deflecting member of the first preferred embodiment.
Figure 7:
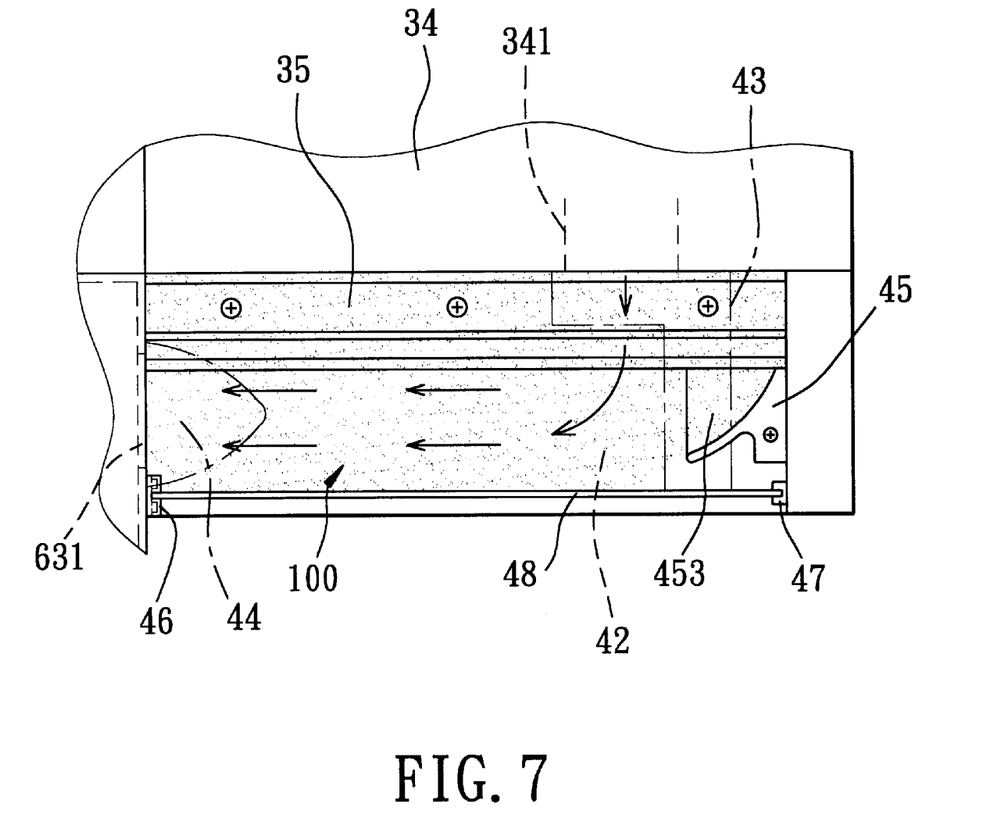
FIG. 7 is a fragmentary schematic view of the shaving collecting member of the first preferred embodiment, which illustrates a shaving passageway.

With reference to FIGS. 5 and 7, a shaving collecting member 40 is disposed on the support seat 333 and rearwardly of the motor housing 34, and includes a collecting plate 41 which has a front plate portion 421 that surrounds circumferentially a top portion of the cutting shaft 35 to define therebetween an intake port for entrance of wood shavings upon planing, and a rear plate portion 422 that extends rearwardly and in the transverse direction from the front plate portion 421 and that cooperates with the support seat 333 to confine a shaving passageway 42 for collecting the wood shavings. An outlet port 44 is disposed adjacent to the left side 37 to be connected to the inlet port 631 of the blower casing 61 to communicate the shaving passageway 42 with the accommodation chamber 65, and has a plurality of abutting members 441 which abut against the distal wall 63 of the blower casing 61. Alternatively, the outlet port 44 may be formed integrally with the inlet port 631.

In addition, two positioning blocks 46,47 are secured respectively on the side portions 332,331 of the support carriage 33 and rearwardly of the rear plate portion 422, and have engaging slots 461,471 such that a rear transparent visual plate 48 can be positioned between the positioning blocks 46,47 at two ends 481,482 which are inserted into the engaging slots 461,471. Upper and lower edges 484,483 of the plate 48 abut against the rear plate portion 422 and the support seat 333 to permit monitoring of the shaving collecting operation.

An air conduit 43 confines a flow channel which is connected to and which is in fluid communication with the vent port 341 of the motor housing 34 and the intake port of the shaving collecting plate 41 and which extends in the transverse direction to permit air stream to flow rearwardly into the shaving passageway 42.

An air stream deflecting member 45 is secured on the support seat 333 adjacent to the right side 36 and the rear transparent visual plate 48, and has an arcuate deflecting wall 453 which is disposed downstream of the vent port 341 and which is disposed in the shaving passageway 42 to deflect the air stream into a route that confronts the inlet port 631 in the longitudinal direction.

With the construction as such, rotation of the motor results in air flow from the vent port 341 into the flow channel of the air conduit 43, and simultaneously causes rotation of the impeller 80 via the drive shaft 70, which, in turn, results in induction of air flow from the flow channel to the shaving passageway 42. The wood shavings 100 can be drawn from the shaving passageway 42 into the accommodation chamber 65 and out of the discharge port 62.

By utilizing the air stream generated during rotation of the motor and by incorporating a blowing mechanism 60, which is driven by the motor via the cutting shaft 35, the removal of the shavings 100 upon planing can be enhanced, and the energy required to collect the shavings 100 can be significantly reduced.

Moreover, by virtue of the air stream deflecting member 45, the deflected air stream flowing along the route passes by the outlet port 44 so as to entrain wood shavings 100 thereinto for onward movement to the inlet port 631, thereby preventing collection of the wood shavings 100 at a corner of the shaving collecting member 40.

Further, since the blower casing 41 is disposed inboard of the left support rod 322, and since the outlet port 44 and the inlet port 631 are connected to each other without using a connecting conduit as taught in the aforesaid U.S. patent, the wood planing machine of this invention has a compact size.

Figure 9:
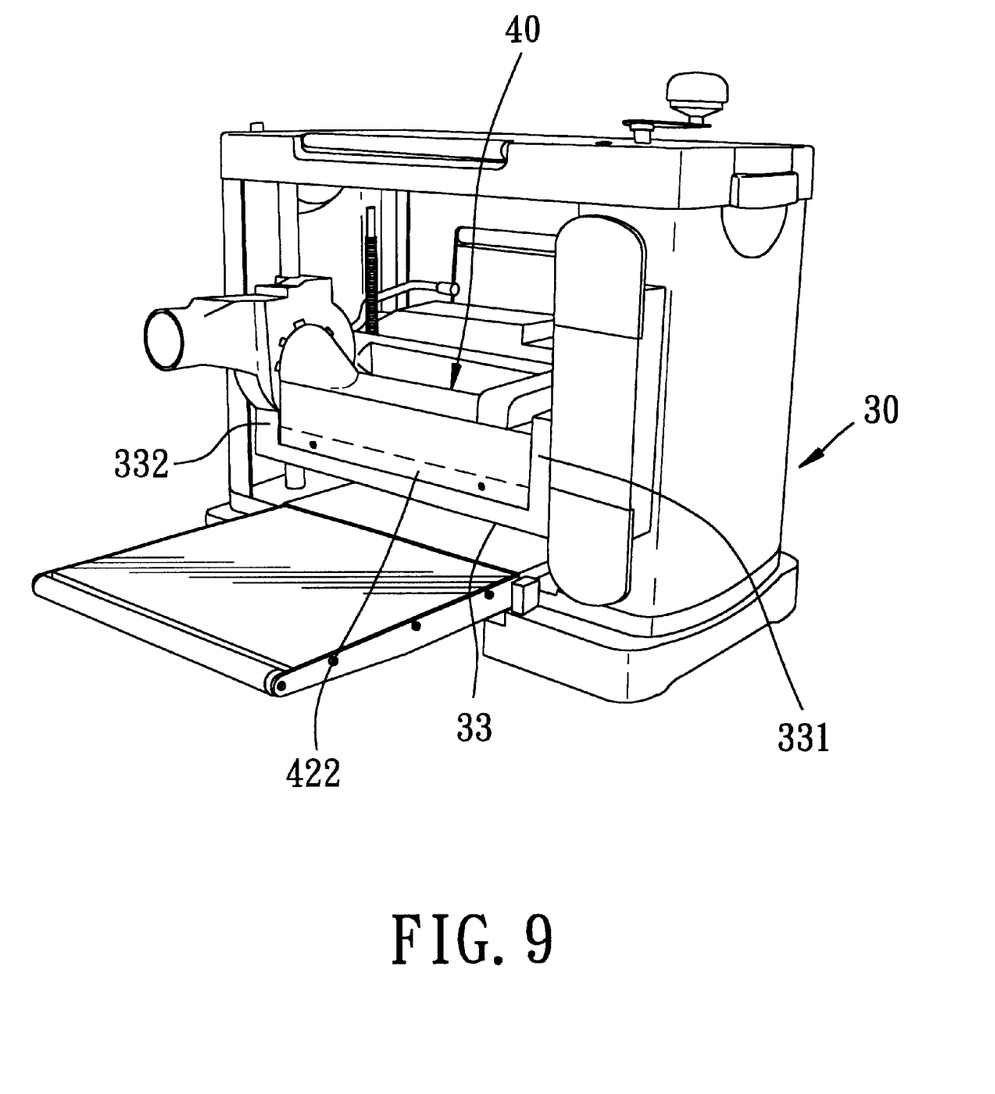
FIG. 9 is a perspective view of a second preferred embodiment of the wood planing machine of this invention.

Referring to FIG. 9, the second preferred embodiment of this invention is shown to have a construction similar to that of the previous embodiment, the main difference residing in that the rear plate portion 422 of the shaving collecting plate extends rearwardly and downwardly to abut against the support carriage 33. This embodiment does not include a rear transparent visual plate similar to that of the previous embodiment.

Figure 10:
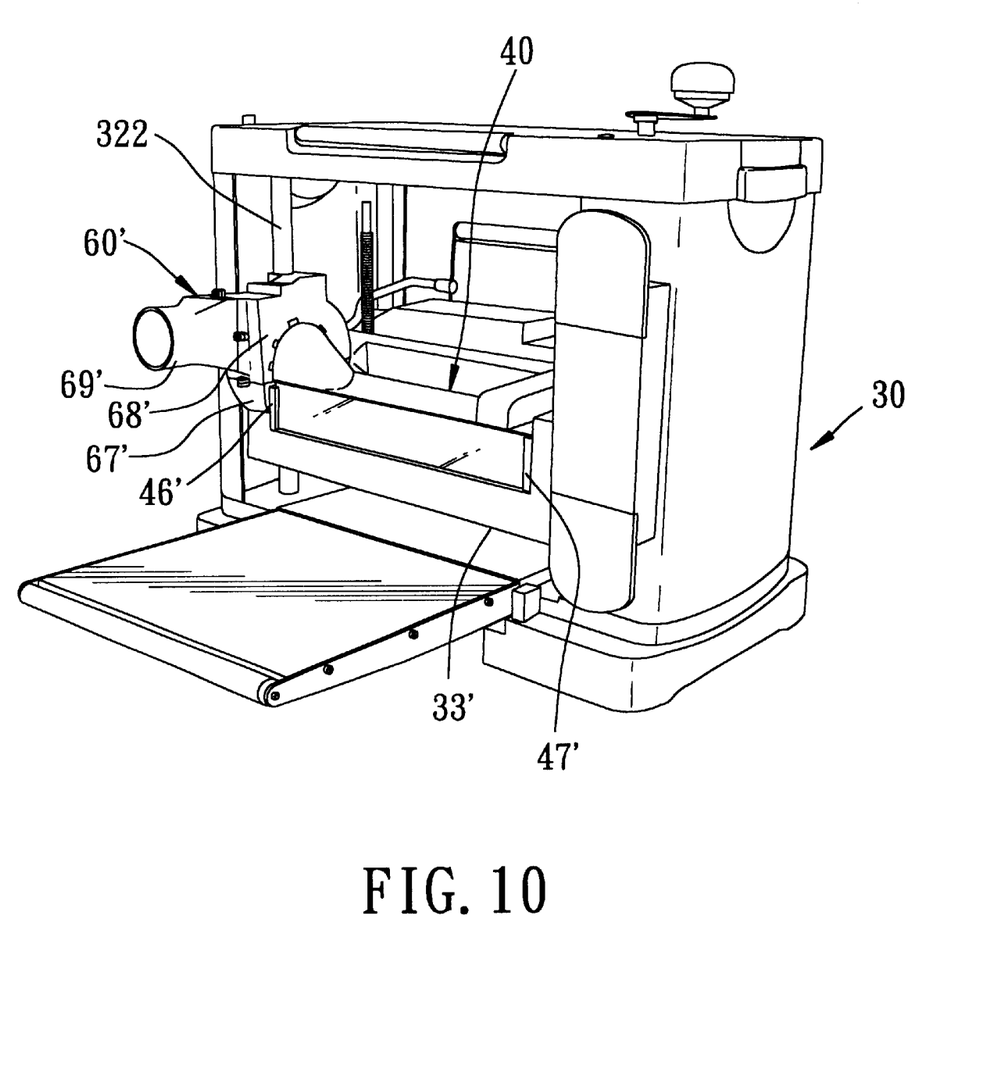
FIG. 10 is a perspective view of a third preferred embodiment of the wood planing machine of this invention.
Figure 11:
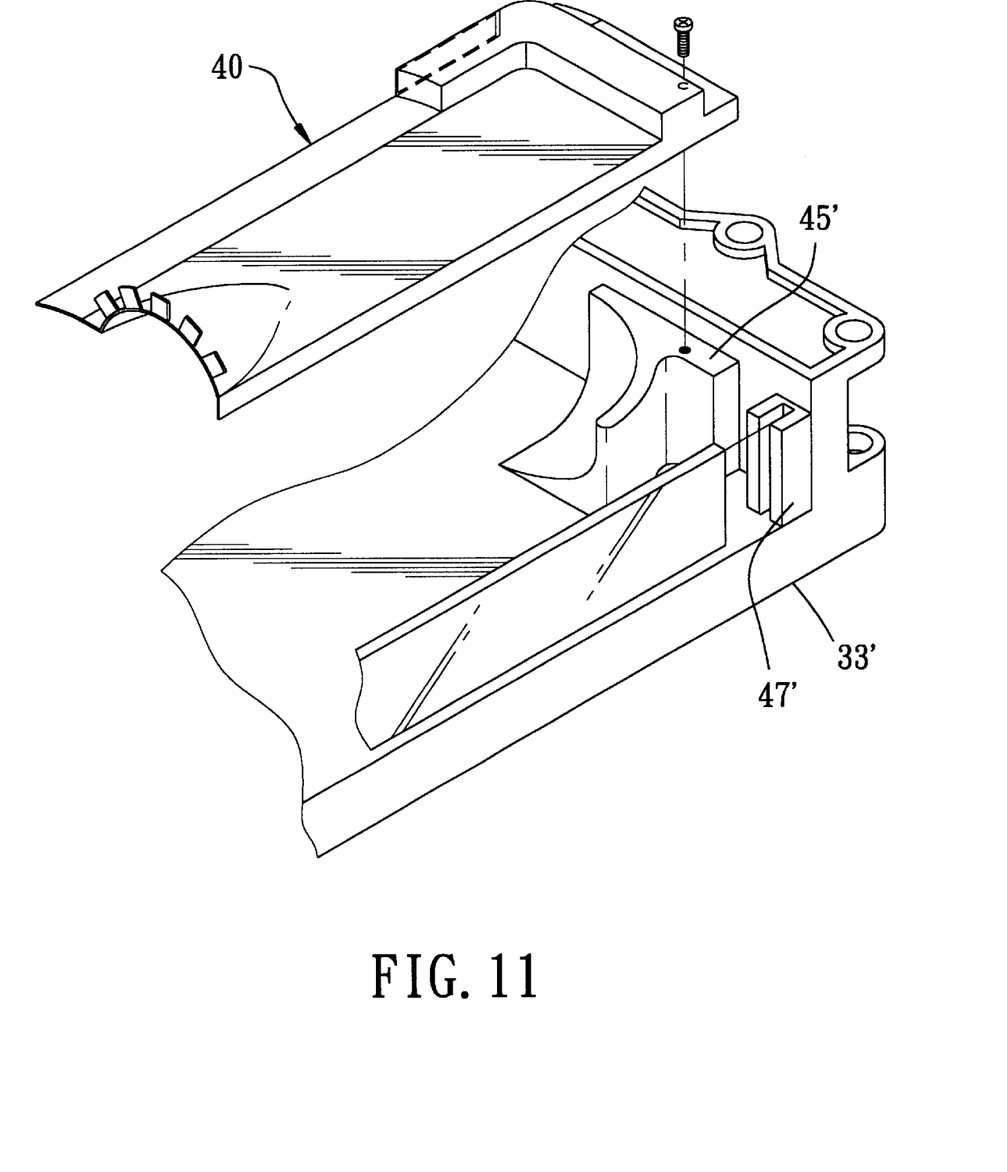
FIG. 11 is an exploded perspective view of a portion of the third preferred embodiment.
Figure 12:
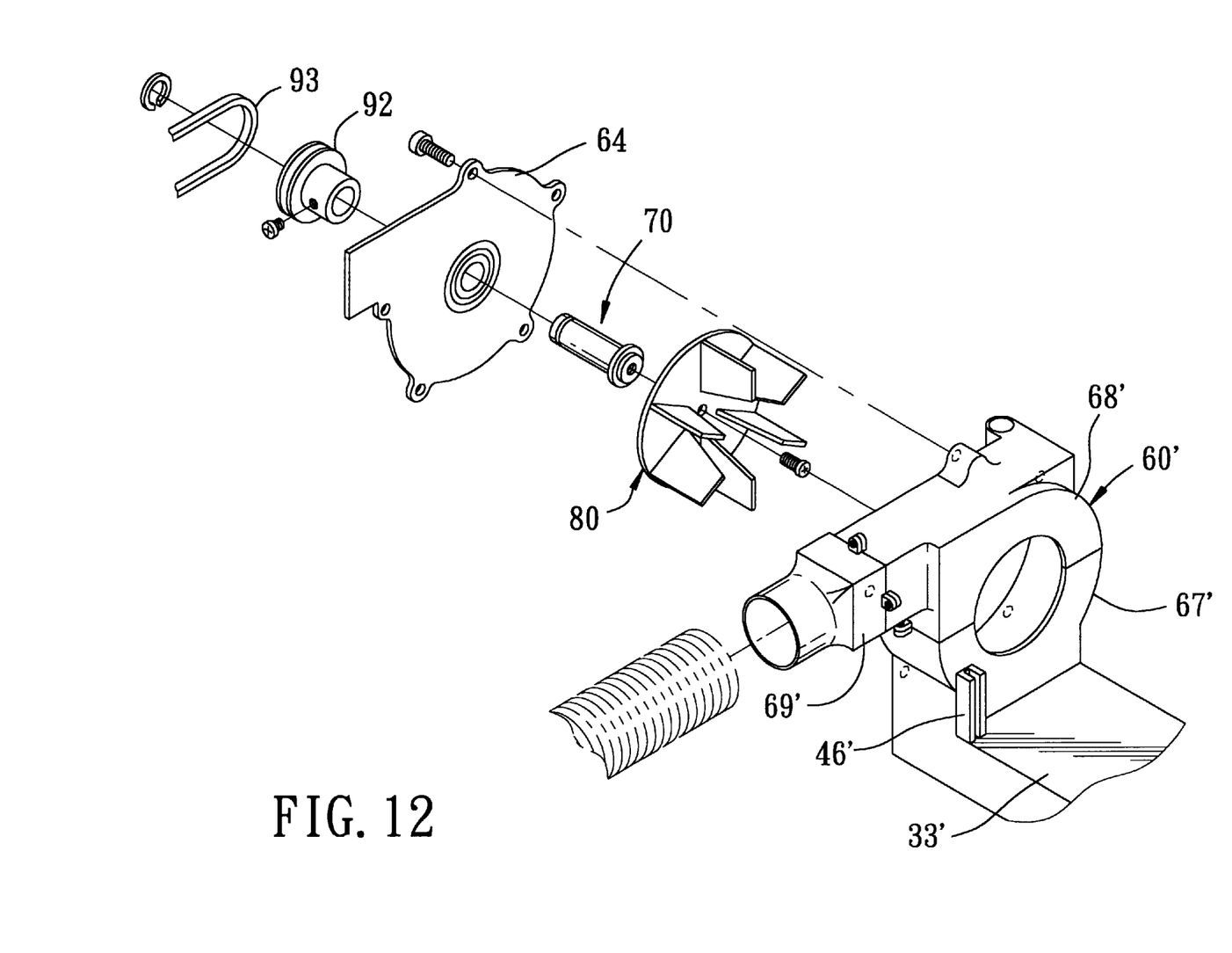
FIG. 12 is an exploded perspective view of a blowing mechanism of the third preferred embodiment.

Referring to FIGS. 10 to 12, the third preferred embodiment of this invention is shown to have a construction similar to that of the first preferred embodiment, the main difference residing in that the air stream deflecting plate 45' and the positioning blocks 46',47' are formed integrally with the support carriage 33' by casting, and that the blower casing 60' includes a first casing portion 67' which is formed integrally with the support carriage 33', a second casing portion 68' which is sleeved on the support rod 322 and which is secured on the first casing portion 67', and a discharge port 69' which is secured on the second casing portion 68'.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A wood planing machine comprising:
    a mounting frame having right and left sides spaced apart from each other in a longitudinal direction, upper and lower ends opposite to each other in an upright direction transverse to the longitudinal direction, and front and rear sides spaced apart from each other in a transverse direction relative to the longitudinal and upright directions;
    a support carriage mounted on said right and left sides and disposed movably between said upper and lower ends in the upright direction;
    a motor housing mounted on said support carriage;
    a motor with an output shaft which is received in said motor housing and which defines a first axis extending in the longitudinal direction to deliver a driving force;
    an air duct disposed adjacent to said right side for passage of introduced air, and having a communicating port which is disposed proximate to said front side and which faces rearwardly for delivery of the introduced air;
    a cutting member having a rotatable cutting shaft which is mounted on said support carriage and proximate to said rear side, and which is driven by said output shaft to be rotatable about a second axis parallel to the first axis;
    a blower casing disposed adjacent to said left side, and having proximate and distal walls which are spaced apart from each other in the longitudinal direction and which are respectively proximate and distal to said left side to confine an accommodation chamber, said blower casing further having a discharge port which is disposed between said proximate and distal walls and which extends in a direction radial to the longitudinal direction, said distal wall having an inlet port which is formed therethrough;
    a shaving collecting member disposed on said support carriage and rearwardly of said motor housing to confine a shaving passageway for collecting wood shavings, said shaving passageway having an intake port which is disposed in the vicinity of said cutting shaft, and an outlet port which is disposed downstream of said intake port and which is connected to said inlet port to communicate said shaving passageway with said accommodation chamber;
    an air conduit confining a flow channel which is connected to and which is in fluid communication with said communicating port and said intake port of said shaving passageway and which extends in the transverse direction to permit air stream to flow rearwardly;
    an air stream deflecting member disposed on said support carriage proximate to said rear side and adjacent to said right side, and having a deflecting wall which is disposed downstream of said communicating port and upstream of said outlet port to deflect the air stream into a route that confronts said inlet port in the longitudinal direction, such that the deflected air stream flowing along said route passes by said outlet port so as to entrain wood shavings thereinto for onward movement to said inlet port;
    a drive shaft rotatably mounted on said proximate wall, extending along a third axis parallel to the first axis, and having a first end which extends into said accommodation chamber, and a second end which extends from said first end and outwardly of said distal wall;
    a drive transmission member disposed to transmit the driving force of said output shaft to said second end of said drive shaft so as to rotate said drive shaft about the third axis when said motor is operated; and
    an impeller received in said accommodation chamber, and driven by said first end of said drive shaft to rotate about the third axis so as to draw wood shavings from said shaving collecting member into said accommodation chamber and out of said discharge port.

2. The wood planing machine of claim 1, wherein said motor housing has a vent port which is disposed adjacent to said right side and which serves as said communicating port.

3. The wood planing machine of claim 2, wherein said shaving collecting member includes a collecting plate having a front plate portion which surrounds circumferentially a top portion of said cutting shaft to define therebetween said intake port, and a rear plate portion which extends in the transverse direction from said front plate portion and which cooperates with said support carriage to confine said shaving passageway.

4. The wood planing machine of claim 3, wherein said shaving collecting member further includes a rear transparent visual plate disposed proximate to said rear side to permit monitoring of the deflected air stream.

5. The wood planing machine of claim 1, wherein said outlet port of said shaving collecting member and said inlet port of said blower casing are formed integrally with each other.

6. The wood planing machine of claim 1, wherein said drive transmission member includes a pulley-and-belt mechanism disposed between said cutting shaft and said second end of said drive shaft so as to transmit rotating force of said output shaft via said cutting shaft to rotate said drive shaft when said motor is operated.

* * * * *